US012589831B2

(12) United States Patent
Chen

(10) Patent No.: US 12,589,831 B2
(45) Date of Patent: Mar. 31, 2026

(54) REVERSE GEAR APPARATUS FOR HARLEY-DAVIDSON MOTORCYCLE

(71) Applicant: Hunan Hongxiang Automobile Maintenance and Service Co., Ltd., Changsha (CN)

(72) Inventor: Lizhong Chen, Changsha (CN)

( * ) Notice: Subject to any disclaimer, the term of this patent is extended or adjusted under 35 U.S.C. 154(b) by 0 days.

(21) Appl. No.: 18/802,326

(22) Filed: Aug. 13, 2024

(65) Prior Publication Data

US 2025/0153804 A1    May 15, 2025

(30) Foreign Application Priority Data

Nov. 14, 2023    (CN) .......................... 202323071319.7

(51) Int. Cl.
B62M 11/04    (2006.01)
(52) U.S. Cl.
CPC .................................... B62M 11/04 (2013.01)
(58) Field of Classification Search
CPC .................. B62M 11/04; F16H 63/302; F16H 2003/0822
See application file for complete search history.

(56) References Cited

U.S. PATENT DOCUMENTS 3,766,794 A * 10/1973 Wilcox ................... F16D 11/10
192/48.91
6,708,579 B2 * 3/2004 Punko ....................... F16H 1/16
180/65.23

8,001,862 B2 * 8/2011 Albulushi ................. F16H 3/14
74/337.5
9,188,198 B2 * 11/2015 Hall ......................... F16H 61/68
11,971,000 B2 * 4/2024 Rajek ...................... F02N 15/02
12,398,786 B2 * 8/2025 Voges ..................... F16H 3/089
2007/0022833 A1 * 2/2007 Mamba ................. F16H 63/302
74/321
2016/0102752 A1 * 4/2016 Yelvington ............ B62K 11/04
475/269
2022/0325686 A1 * 10/2022 Rajek ........................ F02N 3/04
2023/0076135 A1 * 3/2023 Tesar .................... F16H 57/082

FOREIGN PATENT DOCUMENTS

CN        115355311 A    11/2022
CN        218063357 U    12/2022

* cited by examiner

*Primary Examiner* — Victor L MacArthur

(57)        ABSTRACT

The present invention relates to the technical field of reverse gears, and in particular to a reverse gear apparatus for a Harley-Davidson motorcycle, and specifically refers to a reverse gear apparatus for a 6-speed gearbox for Harley-Davidson touring and soft tail series. The reverse gear apparatus includes: a handle part and a mounting part connected to one end of the handle part, where the handle part is used for mounting a driving apparatus, to serve as a power source for driving a driven shaft of a power apparatus connected with the motorcycle to rotate; a clutch connector is mounted on the mounting part, one end of the clutch connector is fixedly connected with the driven shaft of the power apparatus of the motorcycle, and the other end of the clutch connector is connected with the driving apparatus.

8 Claims, 10 Drawing Sheets

A–A

111

3

121

REVERSE GEAR APPARATUS FOR HARLEY-DAVIDSON MOTORCYCLE

TECHNICAL FIELD

The present invention relates to the technical field of reverse gears, and in particular to a reverse gear apparatus for a Harley-Davidson motorcycle.

BACKGROUND

At present, two-wheeled motorcycles have no reversing function, so that when reversing is needed, a user has to touch the ground with his feet and moves backward slowly. However, this is undoubtedly very difficult for the heavy Harley-Davidson motorcycles, especially for Harley-Davidson touring and soft tail series, and inconvenience is brought to users due to the great weight of the Harley-Davidson motorcycles. Since an existing driving mechanism of the Harley-Davidson motorcycle is relatively complex and mature, a large amount of cost is required if the original driving mechanism is changed to add the reversing function. Therefore, a reverse gear apparatus which can be directly additionally mounted on the motorcycle without greatly changing the existing driving mechanism is specially designed.

SUMMARY

In order to solve the problem of inconvenience in installation of an existing reverse gear for the motorcycle, the present invention provides a reverse gear apparatus for a Harley-Davidson motorcycle.

A technical solution of the present invention is as follows.

On the one hand, the present invention provides a reverse gear apparatus for a Harley-Davidson motorcycle, characterized in that, including: a bracket main body, where the bracket main body comprises a handle part and a mounting part connected to one end of the handle part, and the handle part is adapted to mount a driving apparatus; and a clutch connector is mounted on the mounting part, one end of the clutch connector is adapted to be fixedly connected with a driven shaft of a power apparatus of the motorcycle, and the other end of the clutch connector is connected with the driving apparatus.

Further, a first mounting hole and a second mounting hole are formed in the mounting part, the first mounting hole is adapted to sleeve an outer side of a driving shaft of the power apparatus of the motorcycle, and the clutch connector is rotatably mounted in the second mounting hole.

Further, the driving apparatus comprises a driving member and a transmission structure, the driving member is mounted at one end of the handle part far away from the mounting part, an accommodating cavity is formed in the handle part, an interior of the accommodating cavity is used for accommodating the transmission structure, and the driving member is connected with the clutch connector through the transmission structure.

Further, the driving member is a forward and reverse motor.

Further, the transmission structure is a gear transmission structure, a sprocket transmission structure or a belt pulley transmission structure.

Further, a plurality of threaded connection holes and/or through holes are formed in the bracket main body.

Further, the clutch connector comprises a rotating shaft, an outer side of the rotating shaft is sleeved with a shaft sleeve, and the shaft sleeve is connected with the rotating shaft through a unidirectional transmission structure; the outer side of the shaft sleeve is sleeved with a power wheel, the power wheel is connected with the shaft sleeve through an inclined surface clamping mechanism, and the power wheel rotates to drive the shaft sleeve to move and rotate axially through the inclined surface clamping mechanism;

where, the unidirectional transmission structure comprises a driving part disposed on the shaft sleeve and a driven part disposed on the rotating shaft, and the shaft sleeve moves along an axial direction thereof to achieve power connection or power disconnection between the driving part and the driven part.

Further, the inclined surface clamping mechanism comprises first helical teeth uniformly disposed along an inner wall of the power wheel and second helical teeth uniformly disposed along an outer wall of the shaft sleeve, and the first helical teeth and the second helical teeth that are adjacent are meshed with each other; and the first helical teeth and the second helical teeth extend obliquely along the axial direction of the shaft sleeve.

Further, a connecting part is formed at a side, facing the driven shaft of the power apparatus of the motorcycle, of the rotating shaft, and a dismounting hole is formed in a side, facing away from the connecting part, of the rotating shaft.

Further, a resistance mechanism is disposed between the power wheel and the shaft sleeve to provide resistance to the shaft sleeve when the shaft sleeve moves.

The present invention has the following beneficial effects.

The reverse gear apparatus for the Harley-Davidson motorcycle of the present invention specifically refers to the reverse gear apparatus for a 6-speed gearbox for Harley-Davidson touring and soft tail series, including: a handle part and a mounting part connected to one end of the handle part, where the handle part is used for mounting a driving apparatus, to serve as a power source for driving a driven shaft of a power apparatus connected with the motorcycle to rotate; a clutch connector is mounted on the mounting part, one end of the clutch connector is fixedly connected with the driven shaft of the power apparatus of the motorcycle, the other end of the clutch connector is connected with the driving apparatus, and by mounting the bracket main body on an outer side of the power apparatus of the motorcycle to be connected with the driven shaft of the power apparatus, when reversing is needed, the driving apparatus drives the driven shaft of the power apparatus of the motorcycle to rotate by driving the clutch connector to rotate, thereby driving wheels to rotate.

BRIEF DESCRIPTION OF THE DRAWINGS

The accompanying drawings, which are incorporated in and form a part of this specification, illustrate embodiments of the present application and, together with the description, serve to explain principles of the present application.

To describe the technical solutions in the embodiments of the present application or in the prior art more clearly, the following briefly introduces the accompanying drawings for describing the embodiments or the prior art. Apparently, the accompanying drawings in the following description show merely some embodiments of the present application, and a person of ordinary skill in the art may still derive other drawings from the accompanying drawings without creative efforts.

Figure 1:
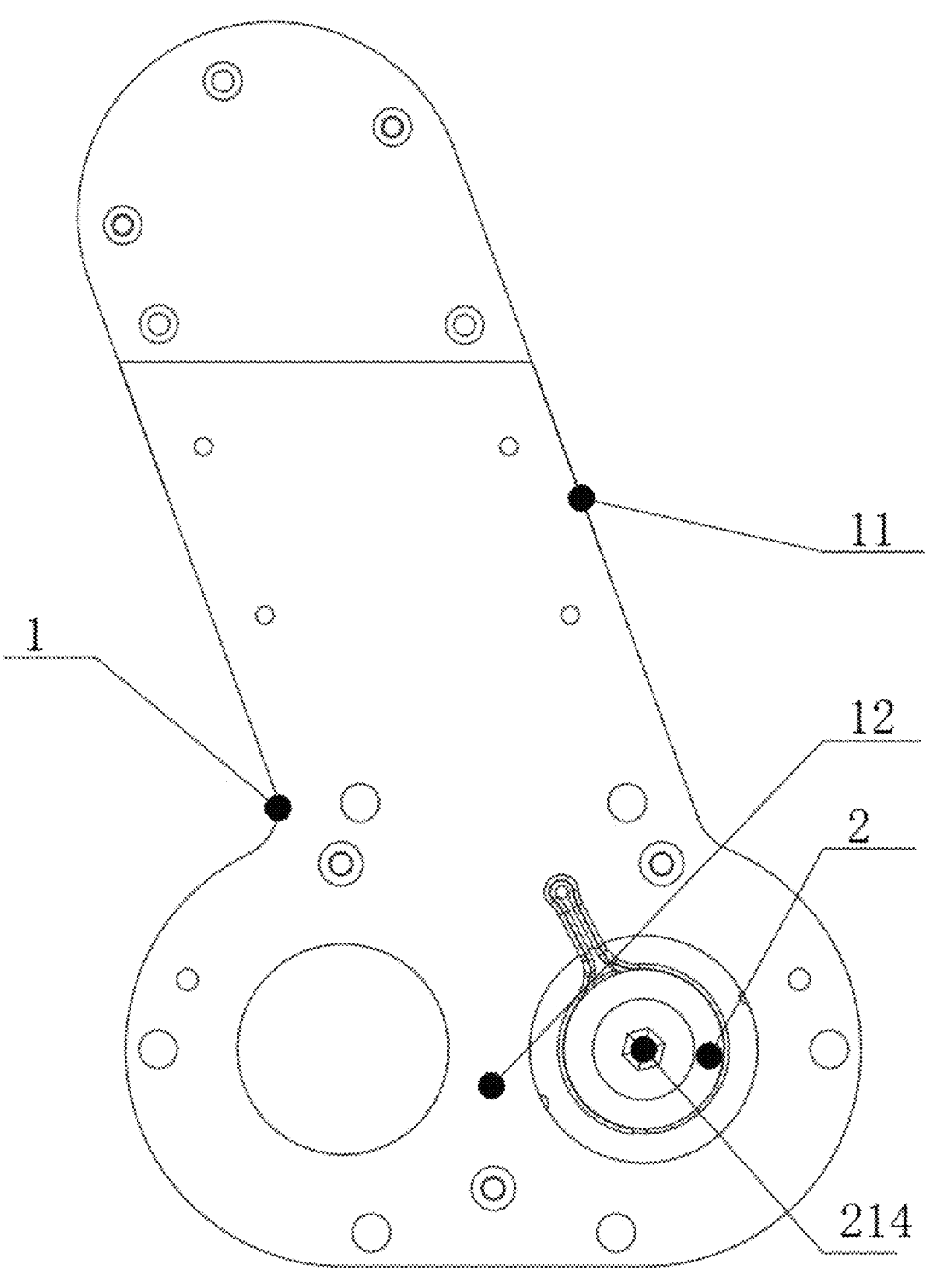

One or more embodiments are exemplarily illustrated by the drawings in the corresponding accompanying drawings, which do not constitute a limitation of the embodiments.

Elements with the same reference numerals in the accompanying drawings represent similar elements, and the drawings in the accompanying drawings do not constitute a scale limitation unless otherwise specified.

Figure 2:
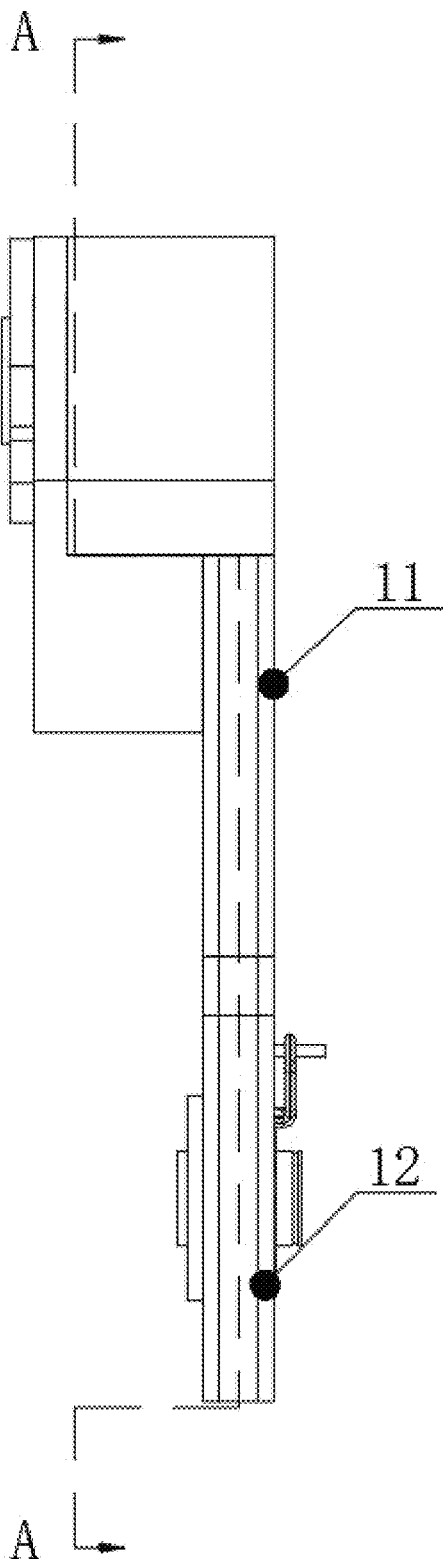
Figure 3:
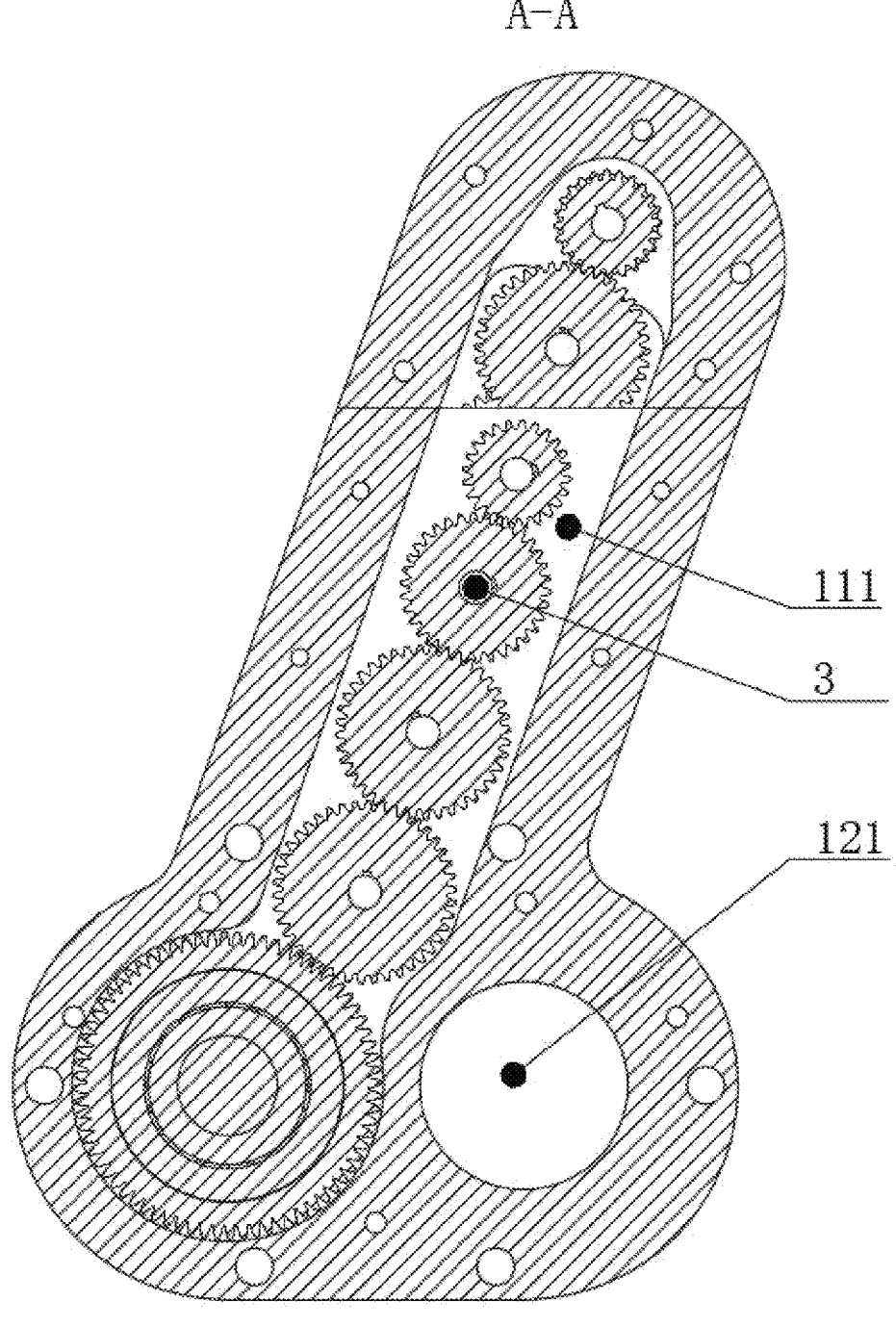
Figure 4:
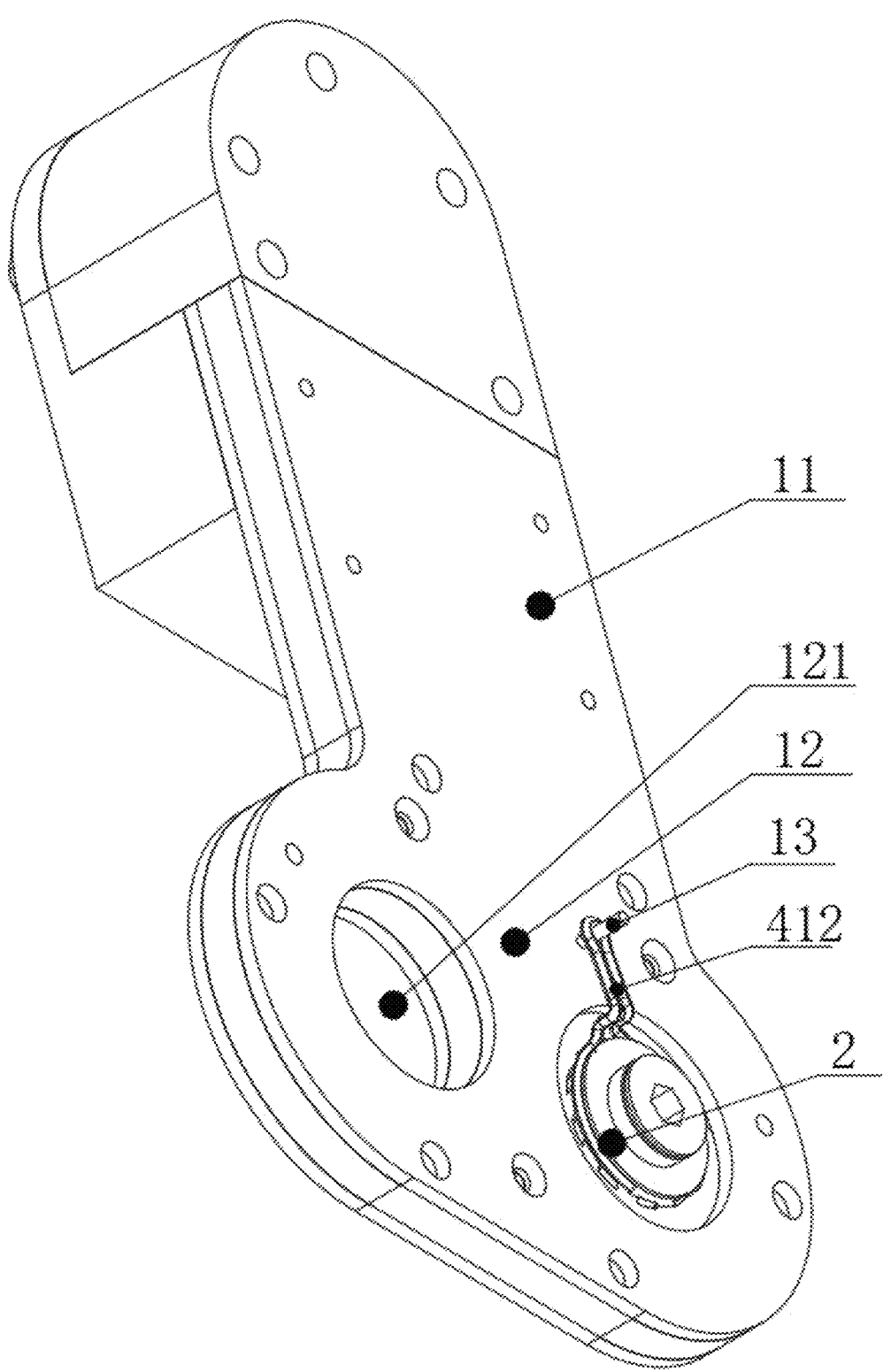
Figure 5:
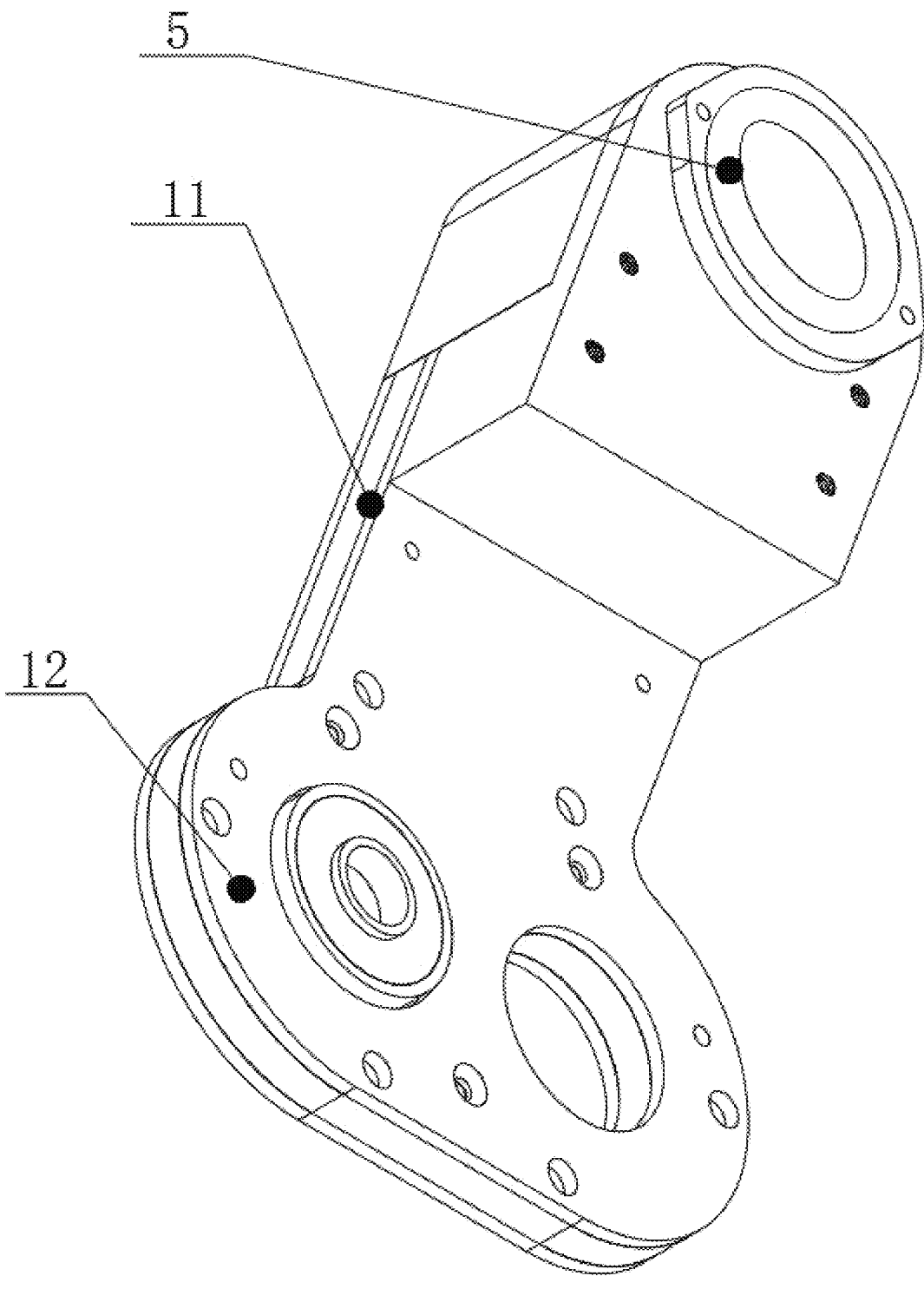
Figure 6:
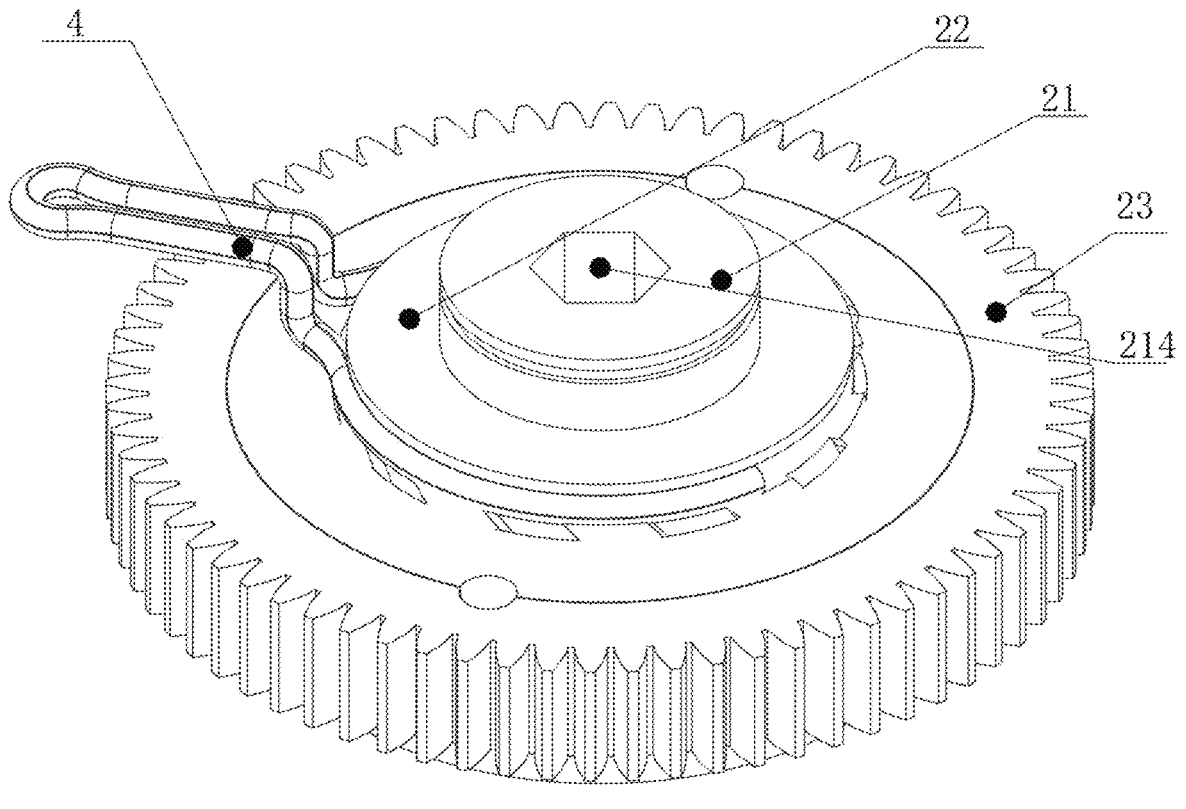
Figure 7:
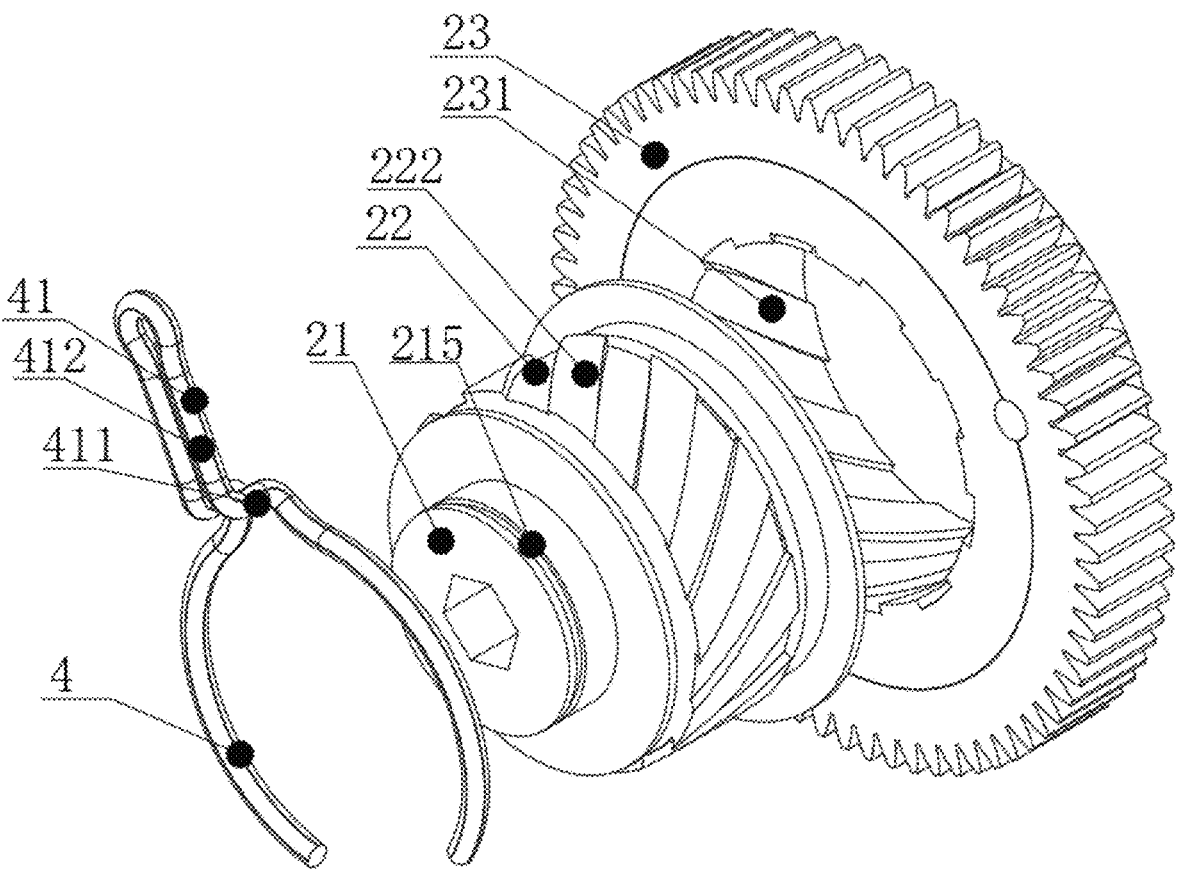
Figure 8:
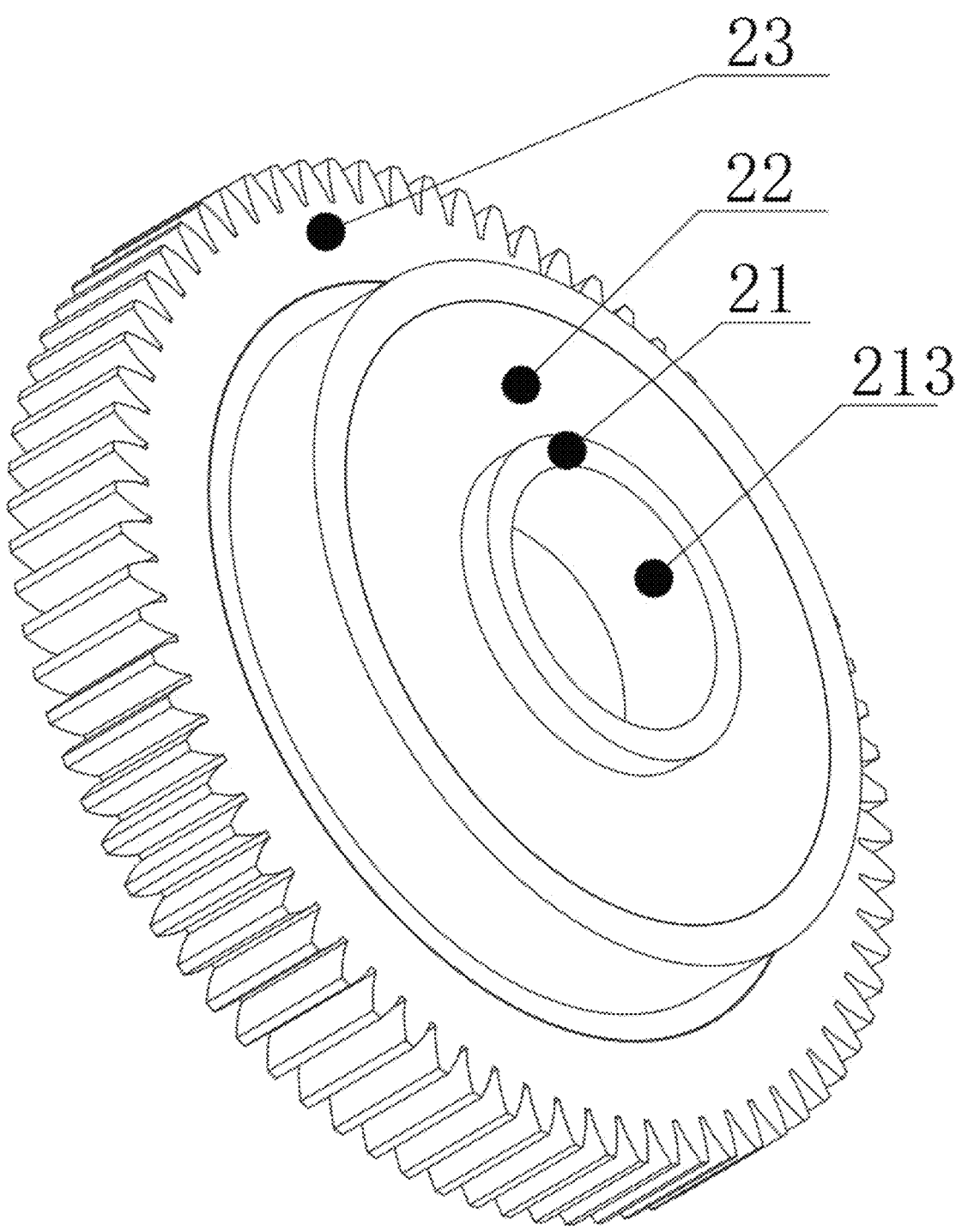
Figure 9:
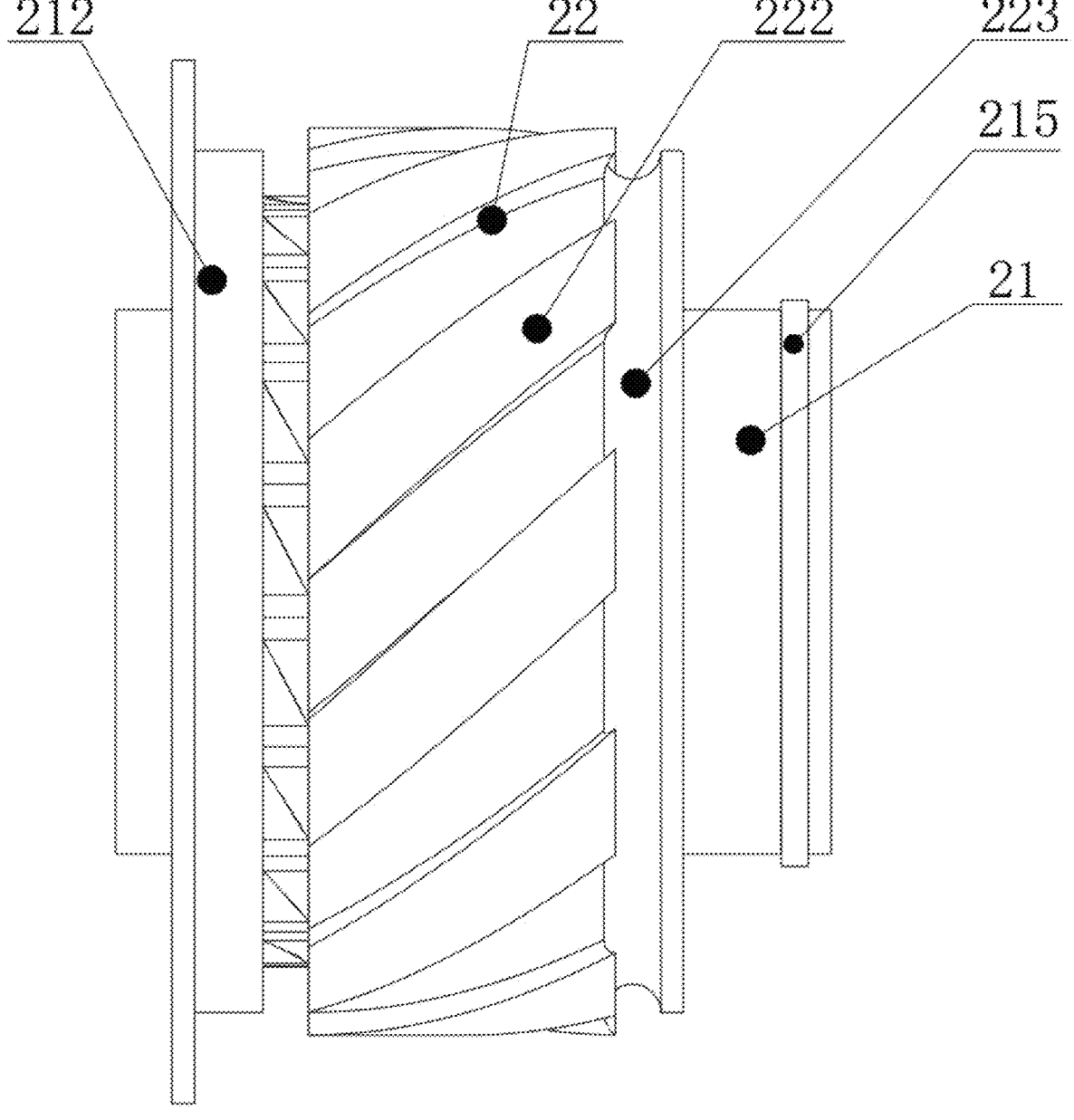
Figure 10:
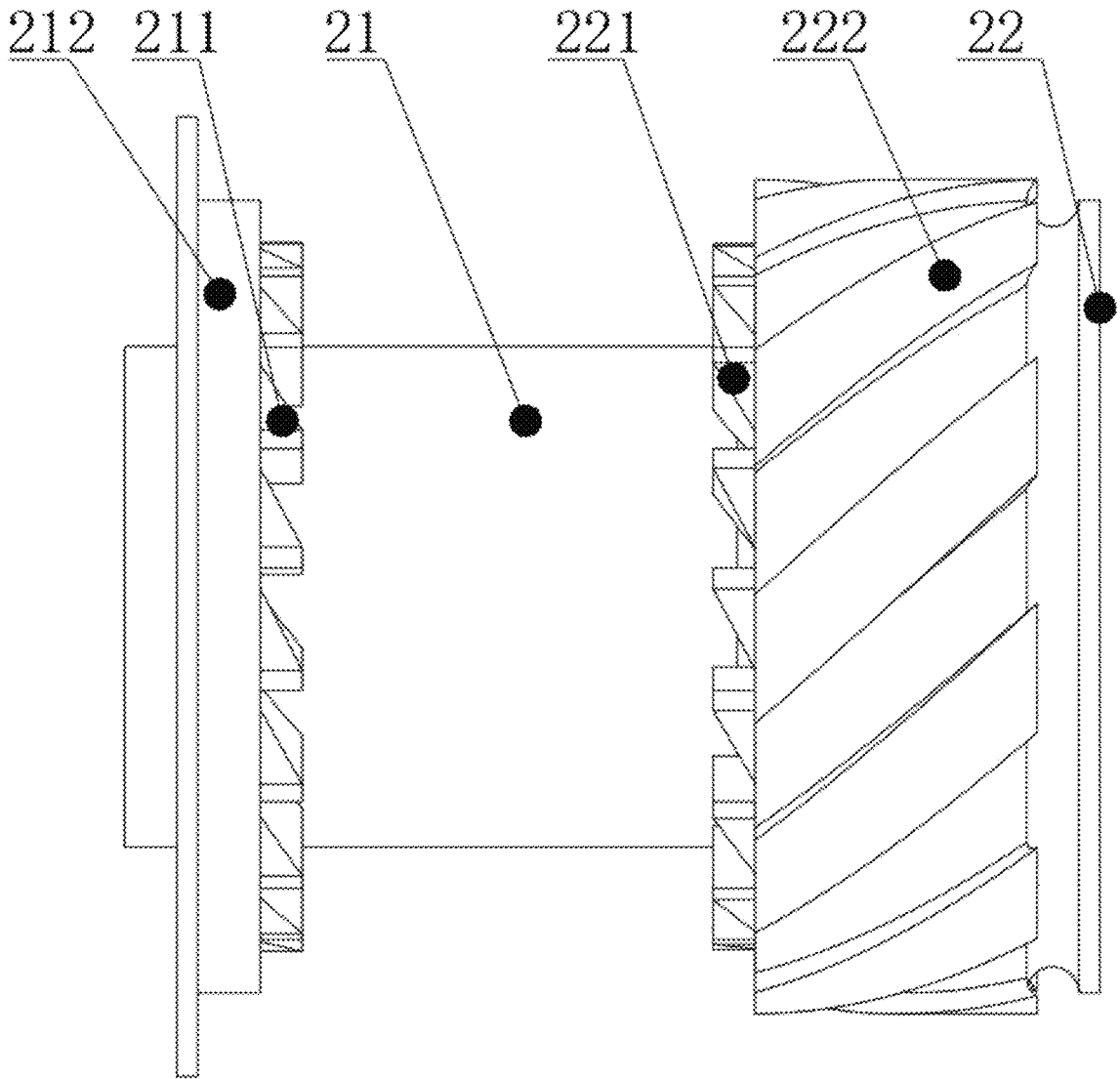

FIG. 1 is a schematic diagram of an overall structure of an embodiment of the present application;

FIG. 2 is a side view of an embodiment of the present application;

FIG. 3 is a sectional view of FIG. 2 taken along line A-A;

FIG. 4 is a first perspective view of an embodiment of the present application;

FIG. 5 is a second perspective view of an embodiment of the present application;

FIG. 6 is a first perspective view of a clutch connector;

FIG. 7 is an exploded structural schematic diagram of the clutch connector;

FIG. 8 is a second perspective view of the clutch connector;

FIG. 9 is a structural schematic diagram when tapered teeth on a shaft sleeve are meshed with tapered teeth on a rotating shaft; and FIG. 10 is a structural schematic diagram when the tapered teeth on the shaft sleeve are separated from the tapered teeth on the rotating shaft.

DETAILED DESCRIPTION OF THE EMBODIMENTS

In order to make the purposes, technical solutions and advantages of the embodiments of the present application clearer, the technical solutions in the embodiments of the present application will be described clearly and completely below in conjunction with accompanying drawings of the present application. Apparently, the embodiments described are some embodiments of the present application, but not all of embodiments. All other embodiments obtained by a person of ordinary skill in the art based on the embodiments of the present application without creative efforts shall fall within the protection scope of the present application.

The following disclosure provides numerous different embodiments or examples for implementing different structures of the present application. In order to simplify the disclosure of the present application, components and arrangements of specific examples are described below. Of course, they are only examples and are not intended to limit the present application. Furthermore, the present application may repeat reference numbers and/or letters in different examples. This repetition is for the purpose of simplicity and clarity and does not in itself dictate a relationship between the various embodiments and/or arrangements discussed.

For ease of description, spatial relative relationship terms can be used herein to describe the relative position relationship or movement between an element or feature and another element or feature as illustrated in the figures, for example, "internal", "external", "inside", "outside", "under", "below", "above", "over", "front", "rear", etc. These spatial relative terms are intended to include different orientations of the apparatus in use or operation other than those depicted in the accompanying drawings. For example, if the apparatus in the accompanying drawings is turned over, or undergoes a posture change or a movement state change, these directional indications will change accordingly. For example, the element described as "below" or "under" other elements or features will then be oriented as "above" or "over" other elements or features. Thus, the example term "below" may include both upper and lower orientations. The apparatus can be otherwise oriented (rotated 90 degrees or in other directions) and the spatially relative descriptors used herein are interpreted accordingly.

Example 1

In order to solve the technical problems of heavy weight and high difficulty in reversing of Harley-Davidson motorcycles of touring and soft tail series, an embodiment of the present application provides a reverse gear apparatus used in cooperation with the 6-speed gearbox for Harley-Davidson touring and soft tail series.

An embodiment of the present application shows a reverse gear apparatus for a Harley-Davidson motorcycle, including a bracket main body 1, where the bracket main body 1 includes a handle part 11 and a mounting part 12 connected to one end of the handle part 11, and the handle part 11 is used for mounting a driving apparatus, to serve as a power source for driving a driven shaft of a power apparatus connected with the motorcycle to rotate; a first mounting hole 121 and a second mounting hole are formed in the mounting part 12, the first mounting hole 121 is adapted to sleeve an outer side of a driving shaft of the power apparatus of the motorcycle (the expression "adapted to" here in combination with the paraphrasing of the whole sentence may be understood as the presence of a state in which the first mounting hole sleeves the outer side of the driving shaft of the power apparatus of the motorcycle, and the same applies to the subsequent "adapted to"). When installation is needed, the first mounting hole 121 sleeves the outer side of the driving shaft of the power apparatus for the motorcycle to avoid the driving shaft of the power apparatus of the motorcycle and reduce the space occupation; a clutch connector 2 is rotatably mounted in the second mounting hole, one end of the clutch connector 2 is adapted to be fixedly connected with the driven shaft of the power apparatus of the motorcycle, the other end of the clutch connector 2 is connected with the driving apparatus, and by mounting the bracket main body 1 on the outer side of the power apparatus of the motorcycle to be connected with the driven shaft of the power apparatus, when reversing is needed, the driving apparatus drives the driven shaft of the power apparatus of the motorcycle to rotate by driving the clutch connector 2 to rotate, thereby driving wheels to rotate.

In one implementation of the present application, firstly, a housing of an engine of the motorcycle is removed to expose the driving shaft connected with the power apparatus and the driven shaft connected with the wheels, and one ends of the driving shaft and the driven shaft are exposed outside the power apparatus (one ends of the driving shaft and the driven shaft extending into the power apparatus are each connected with a gear, and when a clutch of the motorcycle is not engaged, the two gears are meshed with each other; when the clutch of the motorcycle is engaged tightly, the two gears connecting the driving shaft and the driven shaft are separated), and then the first mounting hole 121 of the present application sleeves the outer side of the driving shaft of the power apparatus for the motorcycle, so that the protruding driving shaft of the power apparatus can be avoided and a space occupied by the bracket main body 1 in a thickness direction can be reduced; the clutch connector 2 is fixedly connected with the exposed end of the driven shaft of the power apparatus, and preferably, the clutch connector 2 is in threaded connection with the driven shaft of the power apparatus, where the outer side of the driven shaft of the power apparatus is provided with threads, and a threaded hole is formed in one side, facing the driven shaft of the power apparatus, of the clutch connector 2, so that the space occupied by the bracket main body 1 in the thickness direction can be reduced by this threaded connection manner; then the whole bracket main body 1 is fixed to the power apparatus by means of screws or other fixed connection manners; preferably, the handle part 11 therein is fixed to an outer side wall of the power apparatus in an avoidance manner; finally, the housing of the engine of the motorcycle is remounted to shield the bracket main body 1 and the power apparatus therein; moreover, the bracket main body in the embodiment of the present application is flat as a whole, and in cooperation with avoidance/yielding design such as the threaded connection of the handle part 11, the first mounting hole 121, the clutch connector 2 and the driven shaft of the power apparatus, the space design of the bracket main body 1 in an engine casing is rationalized to avoid a phenomenon that the engine casing is difficult to mount.

In an alternative implementation, the driving apparatus includes a driving member 5 and a transmission structure 3, the driving member 5 is mounted at one end of the handle part 11 far away from the mounting part 12, an accommodating cavity 111 is formed in the handle part 11, and an interior of the accommodating cavity 111 is used for accommodating the transmission structure 3; and the driving member 5 is connected with the clutch connector 2 through the transmission structure 3.

In this implementation, the accommodating cavity 111 is formed in the handle part 11 to accommodate the transmission structure 3, so that the transmission structure 3 can be isolated from an external environment and prevented from being affected by environmental factors, which is beneficial to ensuring long-term and reliable running of the transmission structure 3; alternatively, the handle part 11 can be divided into an upper portion and a lower portion, namely an upper handle body and a lower handle body, grooves are respectively formed in the upper handle body and the lower handle body, and the accommodating cavity 111 is formed when the grooves in the upper handle body and the lower handle body are aligned; alternatively, the handle part can include a handle body with an accommodating groove and a cover body capable of shielding the accommodating groove, and the cover body closes the accommodating groove to form the accommodating cavity 111; the described above are only possible ways to form the accommodating cavity 111, which should not be regarded as a limitation thereof, and other forming ways may also be adopted.

In an alternative implementation, the transmission structure 3 is a gear transmission structure with high transmission efficiency, a compact size and a long service life, which, when applied to the present application, makes the overall structural design of the present application more stable and reliable; preferably, a diameter of the gear gradually increases from the driving member 5 side to the clutch connector 2 side.

In an alternative implementation, the transmission structure 3 is sprocket transmission with relatively high transmission efficiency.

In an alternative implementation, the transmission structure 3 is belt-driven, and operates stably with low noise.

In an alternative implementation, a plurality of threaded connection holes and/or through holes are formed in the bracket main body 1, and the bracket main body 1 is clung to and fixed to the outer side of the power apparatus by passing bolts through the bracket main body 1 and an outer wall of the power apparatus.

In an alternative implementation, the clutch connector 2 includes a rotating shaft 21, an outer side of the rotating shaft 21 is sleeved with a shaft sleeve 22, and the shaft sleeve 22 is connected with the rotating shaft 21 through a unidirectional transmission structure; the outer side of the shaft sleeve 22 is sleeved with a power wheel 23, the power wheel 23 is connected with the shaft sleeve 22 through an inclined surface clamping mechanism, and the power wheel 23 rotates to drive the shaft sleeve 22 to move and rotate axially through the inclined surface clamping mechanism;

where, the unidirectional transmission structure includes a driving part 221 disposed on the shaft sleeve 22 and a driven part 211 disposed on the rotating shaft 21, and the shaft sleeve 22 moves along an axial direction thereof to achieve power connection or power disconnection between the driving part 221 and the driven part 211.

In an alternative implementation, the driving part 221 is a driving ratchet, the driven part 211 is a driven ratchet, and the driving ratchet is meshed with the driven ratchet to achieve power connection; the driving ratchet is separated from the driven ratchet to achieve power disconnection.

When in use, it is assumed that an initial state is that the driven part 211 and the driving part 221 are meshed with each other. There are two states in the embodiment of the present application. One state is that when the motorcycle reverses, the power wheel 23 is driven to rotate clockwise, and when the power wheel 23 rotates clockwise, under the driving of an inclined surface clamping structure, the shaft sleeve 22 moves to the driven shaft side of the power apparatus of the motorcycle until the driving part 221 on the shaft sleeve 22 is fully meshed with the driven part 211 on the rotating shaft 21, and because the power wheel 23 is clamped with the shaft sleeve 22 through the inclined surface clamping structure, when the power wheel 23 drives the shaft sleeve 22 to rotate, the shaft sleeve 22 drives the rotating shaft 21 to rotate clockwise through the meshing between the driving part 221 and the driven part 211, and the rotating shaft 21 drives the wheels to rotate clockwise through the driven shaft of the power apparatus of the motorcycle, thus completing a reversing action of the motorcycle.

The second state is that, when the motorcycle does not need to use a reversing function, the power wheel 23 is driven to rotate counterclockwise, and when the power wheel 23 rotates counterclockwise, under the driving of the inclined surface clamping structure, the shaft sleeve 22 rotates and moves to a side far away from the driven shaft of the power apparatus of the motorcycle until the driving part 221 on the shaft sleeve 22 is completely separated from the driven part 211 on the rotating shaft 21; although the driven shaft of the power apparatus of the motorcycle drives the rotating shaft 21 to rotate through a connecting part 213 while driving the wheels to rotate, other mechanisms (the shaft sleeve 22 and the power wheel 23) does not affect the wheel rotation of the motorcycle due to the fact that the driven part 211 is separated from the driving part 221, and at this time, the motorcycle operates normally. It can be understood that the description of clockwise and counterclockwise is only to clearly explain a use process of the embodiment of the present application, and the reverse description is equally possible and should not be taken as limitation thereto.

In an alternative implementation, the inclined surface clamping mechanism includes first helical teeth 231 uniformly disposed along an inner wall of the power wheel 23 and second helical teeth 222 uniformly disposed along an outer wall of the shaft sleeve 22, and the first helical teeth 231 and the second helical teeth 222 that are adjacent are meshed with each other; and the first helical teeth 231 and the second helical teeth 222 extend obliquely along the axial direction of the shaft sleeve 22.

In this implementation, when the power wheel 23 is driven clockwise, the first helical teeth 231 on the power wheel 23 and the second helical teeth 222 on the shaft sleeve 22 undergo inclined surface fitting to push the shaft sleeve 22 to move to the driven shaft side of the power apparatus, and meanwhile, the power wheel 23 also drives the shaft sleeve 22 to rotate since the first helical teeth 231 are meshed with the second helical teeth 222;

when the power wheel 23 is driven counterclockwise, the first helical teeth 231 on the power wheel 23 cooperate with the second helical teeth 222 on the shaft sleeve 22 to drive the shaft sleeve 22 to rotate and, at the same time, move to a side far away from the driven shaft of the power apparatus.

Preferably, the first helical teeth 231 and the second helical teeth 222 are fitted and nested with each other to facilitate stable transmission.

In an alternative implementation, one end of the rotating shaft 21 is connected with a boss 212, and a connecting part 213 is disposed at a side, facing the driven shaft of the power apparatus of the motorcycle, of the boss 212, and a plurality of driven parts 211 are formed at a side, facing away from the connecting part 213, of the boss 212, to cooperate with the driving parts 221.

In an alternative implementation, a connecting part 213 is formed at a side, facing the driven shaft of the power apparatus of the motorcycle, of the rotating shaft 21, and a dismounting hole 214 is formed in a side, facing away from the connecting part 213, of the rotating shaft 21.

In this implementation, one end of the rotating shaft 21 is connected with the boss 212, and by providing the driven part 211 on the boss 212, the driving part 221 on the shaft sleeve 22, when moving to the driven shaft side of the power apparatus, is abutted by the driven part 211.

In an alternative implementation, both the driven part 211 and the driving part 221 have inclined surfaces and vertical surfaces, and each driven part 211 is located between two adjacent driving parts 221; where the inclined surface of the driven part 211 cooperates with the inclined surface of one of the driving parts 221; the vertical surface of the driven part 211 cooperates with the vertical surface of the other one of the driving parts 221; when meshing transmission between the driven part 211 and the driving part 221 is required, the vertical surface of the driving part 221 is driven to push against the vertical surface of the driven part 211 by the rotation of the shaft sleeve 22, thus driving the rotating shaft 21 to rotate; when the driven part 211 needs to be separated from the driving part 221, the driving part 221 is driven to retreat and move away along an inclined surface direction of the driven part 211 through the rotation of the shaft sleeve 22; preferably, the driven part 211 and the driving part 221 are in a zigzag shape capable of being meshed with each other.

In an alternative implementation, the power wheel 23 may be an external gear or a power transmission wheel such as a sprocket or a belt pulley; preferably, the power wheel 23 is selected as the external gear, which facilitates efficient transmission of the transmission structure.

In an alternative implementation, a resistance mechanism is provided between the power wheel 23 and the shaft sleeve 22 to provide resistance to the shaft sleeve 22 when it moves.

In this implementation, the resistance mechanism provides resistance when the shaft sleeve 22 rotates, so that the power wheel 23 can smoothly drive the shaft sleeve 22 to move axially through the inclined surface clamping structure.

In an alternative implementation, the resistance mechanism includes an annular groove 223 formed in the outer side of the shaft sleeve 22, the annular groove 223 is located at a second end of the shaft sleeve 22, a hoop 4 is rotatably sleeved in the annular groove 223, and the hoop 4 is in frictional contact with the annular groove 223, so that the shaft sleeve 22 is subjected to the friction force from the hoop 4 when the shaft sleeve rotates; a first guide part 41 is connected to the hoop 4, and the first guide part 41 is in guiding connection with a second guide part 13 on the fixed bracket for mounting the clutch in an axial direction, so that the hoop 4 and the first guide part 41 can only move along the axial direction of the shaft sleeve 22, and will not be driven to rotate together when the shaft sleeve 22 rotates, thus preventing the hoop 4 from failing to damp the shaft sleeve 22; and with this design, the hoop 4 can only provide resistance when the shaft sleeve 22 rotates, but will not provide resistance to the shaft sleeve when the shaft sleeve 22 moves axially.

In an alternative implementation, the resistance mechanism is a damping surface disposed between the power wheel 23 and the shaft sleeve 22.

In an alternative implementation, the first guide part 41 includes an L-shaped connector 411 and a guide handle 412, a horizontal end of the L-shaped connector 411 is connected with the hoop 4, a vertical end of the L-shaped connector 411 is connected with the guide handle 412 horizontally disposed, and the guide handle 412 is in guiding connection with the second guide part 13 (as shown in the figure); the second guide part 13 is mounted on the fixed bracket for mounting the clutch, the hoop 4 needs to sleeve the shaft sleeve 22, and the hoop 4 and the second guide part 13 are not in a same plane, therefore, it is necessary to additionally adopt the L-shaped connector 411 to yield the fixed bracket for mounting the clutch in order to allow the first guide part 41 to be connected with the second guide part 13 normally.

In an alternative implementation, the hoop 4 and the first guide part 41 are integrally formed by a columnar body, which makes a molding process of the hoop 4 simple and reliable; alternatively, the columnar body is a metal wire or a metal column, or a rubber column or a plastic column, etc.; preferably, in order to ensure the reliability of the hoop 4, the hoop 4 is made of a metal material. And, the hoop 4 has an opening and the hoop 4 is easy to be splayed when the hoop 4 needs to be detached from the shaft sleeve 22, so that the hoop 4 can be smoothly clamped in the annular groove 223 or removed from the annular groove 223; preferably, a side wall of the annular groove 223 is a cambered surface or an inclined surface extending from inside to outside, which further facilitates the assembly/disassembly of the hoop 4 onto/from the shaft sleeve 22. The columnar body is bent into a U-shape to form the guide handle 412, the second guide part 13 may be a stand column, and the U-shaped guide handle 412 sleeves an outer side of the stand column, so as to facilitate displacement along the axial direction of the shaft sleeve 22 relative to the stand column. Alternatively, the second guide part 13 may also be two guide blocks disposed oppositely, and the guide handle 412 is located between the two guide blocks, so that the movement of the guide handle 412 is guided by the two guide blocks.

In an alternative implementation, a limiting part 215 is disposed at an outer side of one end, far away from the connecting part 213, of the rotating shaft 21, so as to limit the relative displacement between the shaft sleeve 22 and the rotating shaft 21.

Alternatively, the limiting part 215 may be a clamping ring which sleeves an outer side wall of the rotating shaft 21, or a plurality of protrusions fixedly connected to the outer side wall of the rotating shaft 21, or the like.

In an alternative implementation, the external gear is composed of an inner gear and an outer gear, a safety pin is connected between the inner gear and the outer gear, and when a stuck phenomenon occurs, the safety pin therebetween can be twisted off to relieve the stuck phenomenon.

It is to be understood that the terms used herein are only for the purpose of describing particular example implementations and are not intended for limitation. Unless the context clearly indicates otherwise, the singular forms "a", "one" and "the", as used herein, may also be expressed to include plural forms. The terms "include", "comprise", "contain", and "have" are inclusive and thus specify the presence of stated features, steps, operations, elements, and/or components, but do not preclude the presence or addition of one or more other features, steps, operations, elements, components, and/or combinations thereof. The method steps, procedures, and operations described herein are not to be construed as necessarily requiring that they are performed in the particular order as described or illustrated, unless an order of performance is specified clearly. It is also to be understood that additional or alternative steps may be employed.

Although the terms first, second, third, and the like may be used herein to describe various elements, components, regions, layers and/or sections, these elements, components, regions, layers and/or sections should not be limited by these terms. These terms may be only used to distinguish one element, component, region, layer or section from another region, layer or section. Unless clearly indicated by the context, terms such as "first" and "second" and other numerical terms when used herein do not imply a sequence or order. Thus, a first element, component, region, layer or section discussed below may be termed a second element, component, region, layer or section without departing from the teachings of the example implementations.

The previous description is only for the purpose of describing particular embodiments of the present application, so as to enable those skilled in the art to understand or implement the present application. Many modifications to these embodiments will be obvious to those skilled in the art, and the general principles defined herein can be implemented in other embodiments without departing from the spirit or scope of the present application. Therefore, the present application is not to be limited to these embodiments shown herein, but is to conform with the widest scope consistent with the principles and novel features of the present application herein.

What is claimed is:

1. A reverse gear apparatus for a Harley Davidson motorcycle, characterized in that, comprising: a bracket main body, wherein the bracket main body comprises a handle part and a mounting part connected to one end of the handle part, and the handle part is adapted to mount a driving apparatus; and a clutch connector is mounted on the mounting part, one end of the clutch connector is adapted to be fixedly connected with a driven shaft of a power apparatus of the motorcycle, and the other end of the clutch connector is connected with the driving apparatus;

the clutch connector comprises a rotating shaft, an outer side of the rotating shaft is sleeved with a shaft sleeve, and the shaft sleeve is connected with the rotating shaft through a driving part disposed on the shaft sleeve and a driven part disposed on a boss that is provided at an end of the rotating shaft to make the driving part on the shaft sleeve, when moving to the driven shaft side of the power apparatus, be abutted by the driven part;

the outer side of the shaft sleeve is sleeved with a power wheel, the power wheel is connected with the shaft sleeve through an inclined surface clamping mechanism, and the power wheel rotates to drive the shaft sleeve to move and rotate through the inclined surface clamping mechanism; and the inclined surface clamping mechanism comprises first helical teeth uniformly disposed along an inner wall of the power wheel and second helical teeth uniformly disposed along an outer wall of the shaft sleeve, and the first helical teeth and the second helical teeth that are adjacent are meshed with each other; and the first helical teeth and the second helical teeth extend obliquely along the axial direction of the shaft sleeve.

2. The reverse gear apparatus for the motorcycle according to claim 1, characterized in that: a first mounting hole and a second mounting hole are formed in the mounting part, the first mounting hole is adapted to sleeve an outer side of a driving shaft of the power apparatus of the motorcycle, and the clutch connector is rotatably mounted in the second mounting hole.

3. The reverse gear apparatus for the motorcycle according to claim 1, characterized in that: the driving apparatus comprises a driving member and a transmission structure, the driving member is mounted at one end of the handle part opposite to the mounting part, an accommodating cavity is formed in the handle part, an interior of the accommodating cavity is used for accommodating the transmission structure, and the driving member is connected with the clutch connector through the transmission structure.

4. The reverse gear apparatus for the motorcycle according to claim 3, characterized in that: the driving member is a forward and reverse motor.

5. The reverse gear apparatus for the motorcycle according to claim 3, characterized in that: the transmission structure is a gear transmission structure, a sprocket transmission structure or a belt pulley transmission structure.

6. The reverse gear apparatus for the motorcycle according to claim 1, characterized in that: a plurality of threaded connection holes and/or through holes are formed in the bracket main body.

7. The reverse gear apparatus for the motorcycle according to claim 1, characterized in that: a connecting part is formed at a side, facing the driven shaft of the power apparatus of the motorcycle, of the rotating shaft, and a dismounting hole is formed in a side, facing away from the connecting part, of the rotating shaft.

8. The reverse gear apparatus for the motorcycle according to claim 1, characterized in that: a resistance mechanism is disposed between the power wheel and the shaft sleeve to provide resistance to the shaft sleeve when it moves.

* * * * *